United States Patent
Fanshawe

(10) Patent No.: US 12,227,722 B2
(45) Date of Patent: Feb. 18, 2025

(54) ELECTROLYTE ENHANCED SPIRITS AND METHOD FOR THE PRODUCTION OF ELECTROLYTE ENHANCED SPIRITS

(71) Applicant: Llyte, LLC, Severna Park, MD (US)

(72) Inventor: William J. Fanshawe, Millersville, MD (US)

(73) Assignee: Llyte, LLC, Millersville, MD (US)

( * ) Notice: Subject to any disclaimer, the term of this patent is extended or adjusted under 35 U.S.C. 154(b) by 2 days.

(21) Appl. No.: 17/571,206

(22) Filed: Jan. 7, 2022

(65) Prior Publication Data

US 2023/0151311 A1    May 18, 2023

Related U.S. Application Data

(60) Provisional application No. 63/279,295, filed on Nov. 15, 2021.

(51) Int. Cl.
    *C12G 3/08* (2006.01)
(52) U.S. Cl.
    CPC .................... *C12G 3/08* (2013.01)
(58) Field of Classification Search
    CPC .................................................. C12G 3/08
    USPC ........................................... 426/592
    See application file for complete search history.

(56) References Cited

U.S. PATENT DOCUMENTS

| | | |
|---|---|---|
| 3,843,809 A | 10/1974 | Luck |
| 5,849,346 A | 12/1998 | Hornack |
| 2005/0191386 A1 | 9/2005 | Adams |
| 2006/0134302 A1 | 6/2006 | Shefler |
| 2009/0291163 A1 | 11/2009 | White et al. |
| 2010/0183736 A1* | 7/2010 | Hays .................. A61P 3/12 424/605 |
| 2010/0291282 A1 | 11/2010 | Yamakawa |
| 2014/0234488 A1* | 8/2014 | Chang .................. A23C 9/156 426/62 |
| 2019/0112564 A1 | 4/2019 | Cyzen |
| 2020/0109163 A1 | 4/2020 | Tang et al. |
| 2021/0188664 A1 | 6/2021 | Wilkie et al. |

FOREIGN PATENT DOCUMENTS

| | | |
|---|---|---|
| AU | 2018203476 A1 | 12/2018 |
| CN | 104305394 A | 1/2015 |
| GB | 1138124 A | 12/1968 |
| RU | 2070574 C1 | 12/1996 |
| RU | 2091459 C1 | 9/1997 |
| RU | 2116341 C1 | 7/1998 |
| RU | 2435841 C2 | 12/2011 |

OTHER PUBLICATIONS

Anon, Oz Trycker: Marko Pavosovic Turns Joke Into $3M Business, 2017, new.com.au accessed at https://www.nzherald.co.nz/business/oz-trucker-marko-pavasovic-turns-joke-into-3m-business/Z4K2TEYRBEBLCAZHW3HQWWC (Year: 2017).*

Auber, High-alkaline vodka launces in Austin; founders say spirit is "better for you"; 2019 accessed at https://www.statesman.com/story/entertainment/dining/2019/07/16/high-alkaline-vodka-launches-in-austin-founders-say-spirit-is-better-for-you/4669156007 / (AUBER). (Year: 2018).*

McKay, Philly Maker Series: stateside Wants to Be the Yards of Vodka, Thrillist, Oct. 20, 2016 accessed at https://www.thrillist.com/drink/philadelphia/stateside-urbancraft-vodka-interview-yuengling-of-vodka (McKay) (Year: 2016).*

* cited by examiner

*Primary Examiner* — Donald R Spamer
*Assistant Examiner* — Philip A Dubois
(74) *Attorney, Agent, or Firm* — The Morales Law Firm; Joseph L. Morales, Esq.

(57) ABSTRACT

An electrolyte enhanced spirit is disclosed. The electrolyte enhanced spirit comprises a spirit and at least two electrolyte salts at a concentration of at least 0.02% w/v. The spirit in some embodiments includes vodka, rum, bourbon, whiskey, gin and distilled liquors. The electrolyte salts include NaCl, $NaHCO_3$, KCl, $KHCO_3$, $K_3PO_4$. The electrolyte enhanced spirit has a pH of 9.3 to 9.7, preferably 9.5. The electrolyte enhanced spirit may also include an additive to control the pH. The additive for controlling the pH of the spirit is selected from at least one of citric acid, an amino acid, ascorbic acid, folic acid, malic acid, phosphoric acid, phosphorous acid, carbonic acid, fumaric acid, tartaric acid, tannic acid, benzoic acid, lactic acid, and acetic acid.

3 Claims, No Drawings

ELECTROLYTE ENHANCED SPIRITS AND METHOD FOR THE PRODUCTION OF ELECTROLYTE ENHANCED SPIRITS

CROSS-REFERENCE TO RELATED APPLICATIONS

The present application claims priority from provisional application No. 63/279,295 filed on Nov. 15, 2021, entitled ELECTROLYTE ENHANCED SPIRITS AND METHOD FOR THE PRODUCTION OF ELECTROLYTE ENHANCED SPIRITS, which is incorporated herein by reference in its entirety.

BACKGROUND

There are many different types of alcoholic beverages for human consumption. People drink alcoholic beverages for various reasons. Some drink because they enjoy the taste, whether as a drink alone or as an accompaniment to various meals. Other people enjoy the sensory experience that alcohol produces, even if the taste of alcohol is not pleasant. People also drink alcohol because they recall prior enjoyable experiences when drinking. Others drink to relieve stress. In some instances, alcohol consumption is part of the person's social norms and customs, such as at parties, weddings, and other events.

Alcoholic beverages are the product of fermentation of a sugar source that is transformed into ethanol and carbon dioxide. Spirits are alcoholic beverages that, in addition to being the product of fermentation, are further distilled to achieve higher levels of alcohol concentration measured as alcohol by volume (ABV). Typically spirits have an ABV of between 20% to 90%, with most falling in the middle range. Traditional spirits include vodka, rum, bourbon, whiskey, gin and other distilled liquors.

Alcohol is absorbed by the body and reaches the brain and spinal cord in the bloodstream. Drinking alcoholic beverages is known to cause dehydration, which may result in biological symptoms such as pounding headaches, dry mouth, nausea, and general malaise. A way to prevent dehydration is to drink water and also to consume electrolytes that allow the body to have sufficient water to metabolize the alcohol in the body. Electrolytes are commonly used to help individuals recover from rehydration. Electrolytes can be found in intravenous liquid bags. Electrolytes can also be found in medicated administered orally to combat dehydration. Electrolytes are also used in sports drinks to assist athletes combat and prevent dehydration.

In order to improve the flavor of alcohol and make it more desirable, spirits have been combined with many different flavorful liquids. This is typically accomplished by your favorite bartender behind the bar. In the recent past, liquor manufacturers have begun to combine spirits with such flavorings during the production of the spirits. Such spirits are bottled and sold as flavored alcohols.

In some instances a spirit, such as vodka, has been combined with mineral water, which provides a spirit with trace amounts of electrolytes. For example, there exist electrolyte infused vodka water marked under the trademark Sole, which is sold in 355 ml portions having an ABV of 5% and a combined electrolyte concentration of 0.056 mg/ml (0.0056% w/v).

Similarly, certain vodka compositions have been shown to include various electrolytes. RU2116341 describes a vodka that has a final concentration of sodium bicarbonate of between 0.0025% w/v and 0.0035% w/v, among other additives. RU2070574 describes a vodka that has a final concentration of sodium bicarbonate of between 0.005% w/v and 0.007% w/v, among other additives. RU2435841 describes a vodka that has a final concentration of combined electrolytes of 0.017% w/v. AU2018203476 describes a vodka that has a final concentration of sodium bicarbonate of between 0.00023% w/v and 0.00046% w/v, among other additives. US2006/0134302 describes a vodka that has a final concentration of sodium bicarbonate of between 0.0009% w/v and 0.0036% w/v, among other additives.

SUMMARY OF THE INVENTION

This application discloses an electrolyte enhanced spirit. The electrolyte enhanced spirit comprises a spirit and at least two electrolyte salts at a concentration of at least 0.02% w/v. In some embodiments, wherein the electrolyte salts are at least one each of a sodium or a potassium salt. The spirit in some embodiments includes vodka, rum, bourbon, whiskey, gin and distilled liquors. The electrolyte salts are selected from one or more of NaCl (sodium chloride), $NaHCO_3$ (sodium bicarbonate), KCl (potassium chloride), $KHCO_3$ (Potassium bicarbonate), $K_3PO_4$ (potassium phosphate), $C_4H_5K_2NO_4$ (potassium aspartate), $C_4H_5NNa_2NO_4$ (sodium aspartate), a person of ordinary skill in the art would understand that other electrolyte salts can be utilized. The electrolyte enhanced spirit has a pH of 9.3 to 9.7, preferably 9.5. The electrolyte enhanced spirit may also include an additive to control the pH. The additive for controlling the pH of the spirit is selected from one or more of citric acid, amino acids, ascorbic acid, folic acid, malic acid, phosphoric acid, phosphorous acid, carbonic acid, fumaric acid, tartaric acid, tannic acid, benzoic acid, lactic acid, and acetic acid. In some embodiments, sodium citrate and potassium citrate can be utilized as the acid additive to control pH.

One embodiment of an electrolyte enhanced spirit, comprises sodium chloride in a concentration of between 0.003 and 0.207% w/v; sodium bicarbonate in a concentration of between 0.003 and 0.116% w/v; potassium chloride in a concentration of between 0.006 and 0.207% w/v; potassium bicarbonate in a concentration of between 0.005 and 0.186% w/v; potassium phosphate in a concentration of between 0.001 and 0.093% w/v; and wherein the spirit has an alcohol by volume concentration of between about 35% and 45% and a pH of between 9.0 and 10.0.

Another embodiment discloses an electrolyte enhanced spirit, comprising sodium chloride in a concentration of 0.049% w/v; sodium bicarbonate in a concentration of 0.050% w/v; potassium chloride in a concentration of 0.089% w/v; potassium bicarbonate in a concentration of 0.080% w/v; potassium phosphate in a concentration of 0.020% w/v; and wherein the spirit has an alcohol by volume concentration of 40% and a pH of 9.5.

DETAILED DESCRIPTION OF THE INVENTION

The invention summarized above and defined by the enumerated claims may be better understood by referring to the following description. This description of an embodiment, set out below to enable one to prepare and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention.

Those skilled in the art should also realize that such equivalent assemblies do not depart from the spirit and scope of the invention in its broadest form.

For the purposes of this specification and claims, unless otherwise indicated, all numbers expressing quantities of ingredients, percentages or proportions of materials, reaction conditions, and other numerical values used in the specification and claims, are to be understood as being modified in all instances by the term "about." Similarly, when values are expressed as approximations, by use of the antecedent "about," it will be understood that the particular value forms another embodiment that is +/−10% of the recited value. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

As utilized in this application, the term "spirit" or "liquor" means a distilled or spirituous alcoholic beverage as distinguished from a fermented alcoholic beverage such as wine or beer. Such spirits include vodka, rum, bourbon, whiskey, gin and distilled liquors.

In one embodiment, an electrolyte enhanced spirit comprises a spirit and at least two electrolyte salts, wherein the electrolyte enhanced spirit has a combined electrolyte concentration of at least 0.02% w/v. In other embodiments, the electrolyte enhanced spirit comprises at least two electrolyte salts, wherein the electrolyte enhanced spirit has a combined electrolyte concentration is between about 0.02% (w/v) and 0.8% (w/v). In one embodiment, the electrolyte enhanced spirit has a combined electrolyte concentration of 0.3% (w/v).

In some embodiments, the electrolyte salts are at least one each of a sodium salt or a potassium salt. The electrolyte salts are selected from at least one of, in some embodiments, sodium, potassium, calcium, bicarbonate, magnesium, chloride, and phosphorus. In some embodiments, the electrolytes are selected from at least one of phosphate salts, sulfate salts, and other such salts as understood in the art of human hydration. In some embodiments, potassium is included in the form of potassium gluconate, potassium aspartate, potassium citrate, and potassium orotate. Other electrolytes may be selected from at least one of calcium gluconate, calcium carbonate, calcium phosphate, plant based calcium, microcrystalline hydroxyapatite calcium, calcium citrate, calcium citrate malate, calcium lactate, magnesium citrate, magnesium glycinate, magnesium lactate, magnesium malate, magnesium taurate, magnesium oxide, magnesium L-threonate, magnesium orotate, calcium bicarbonate, ammonium bicarbonate.

The electrolyte enhanced spirit, in some embodiments includes the following electrolytes: NaCl (sodium chloride), $NaHCO_3$ (sodium bicarbonate), KCl (potassium chloride), $KHCO_3$ (Potassium bicarbonate), $K_3PO_4$ (potassium phosphate), $C_4H_5K_2NO_4$ (potassium aspartate), $C_4H_5NNa_2NO_4$ (sodium aspartate), a person of ordinary skill in the art would understand that other electrolyte salts can be utilized. In some embodiments, iodized salt is used in the form of NaCl/NaI. In some embodiments, the concentration of NaCl ranges between about 0.00323% (w/v) and about 0.20650% (w/v). In one embodiment, the concentration of NaCl is about 0.04850% (w/v). In another embodiment, the concentration of $NaHCO_3$ is between about 0.00330% (w/v) and 0.11550% (w/v). In one embodiment, the concentration of $NaHCO_3$ is about 0.04950% (w/v). In some embodiments, the concentration of KCl is between about 0.00590% (w/v) and about 0.20650% (w/v). In one embodiment, the concentration of KCl is about 0.08850 (w/v). In some embodiments, the concentration of $KHCO_3$ ranges between 0.00530% (w/v) and 0.18550% (w/v). In one embodiment, the concentration of $KHCO_3$ is about 0.07950% (w/v). In some embodiments, the concentration of $K_3PO_4$ ranges between 0.00133% (w/v) and 0.09333% (w/v). In one embodiment, the concentration of $K_3PO_4$ is about 0.02000% (w/v).

In some embodiments, the electrolyte enhanced spirit includes only at least two of NaCl, $NaHCO_3$, KCl, $KHCO_3$, $K_3PO_4$, $C_4H_5K_2NO_4$, $C_4H_5NNa_2NO_4$, or any other electrolyte salts. In such embodiment, the electrolyte enhanced spirit consists essentially of the spirit and at least two of NaCl, $NaHCO_3$, KCl, $KHCO_3$, $K_3PO_4$, $C_4H_5K_2NO_4$, $C_4H_5NNa_2NO_4$, or any other electrolyte salts. In other embodiments, the electrolyte enhanced spirit consists of the spirit and all of NaCl, $NaHCO_3$, KCl, $KHCO_3$, $K_3PO_4$, $C_4H_5K_2NO_4$, $C_4H_5NNa_2NO_4$, and any other suitable electrolyte salts.

The alcohol content of the electrolyte enhanced spirit, in some embodiments is 40% ABV. One embodiment of the electrolyte enhance spirit has an alcohol concentration of between about 30% to 35% ABV. In some embodiments, the electrolyte enhanced spirit has an alcohol concentration of between about 35% and about 45% ABV. In some embodiments, the alcohol concentration is between about 37% and about 42% ABV. Some embodiments of the electrolyte enhanced spirit can be between 20% and 30% ABV. Some low calory embodiments of the electrolyte enhanced spirits have an alcohol content of between 35% and 37.5% ABV. For some special embodiments, the alcohol content of the electrolyte enhanced spirit is between 40% and 80% ABV.

The electrolyte enhanced spirit in some embodiments has a pH of about 9.5. In some embodiments, the pH of the electrolyte enhanced spirit is between about 9.0 and 11.0. In further embodiments, the pH of the electrolyte enhanced spirit is between about 9.0 and 9.5. In other embodiments, the pH of the electrolyte enhanced spirit is between about 9.2 and 9.7. Regular spirits are typically acidic, with a pH of between 3.0 to 5.0. There are some alkaline spirits, such as vodka with a pH greater than 9.0, but such alkaline products are made using alkaline mineral water. The various embodiments described herein control alkalinity of the spirit through the use of an additive, such as an acid. In one embodiment, the electrolyte enhanced spirit further contains citric acid as an additive, which assists in controlling the pH of the composition.

In some embodiments, the pH of the compositions is controlled through the use of other additives, such as an amino acid, ascorbic acid, folic acid, malic acid, phosphoric acid, phosphorous acid, carbonic acid, fumaric acid, tartaric acid, tannic acid, benzoic acid, lactic acid, and acetic acid. The type of acid used may vary depending on the application. Some preferred embodiments utilize amino acids, phosphoric acid, phosphorous acid, carbonic acid, fumaric acid, tartaric acid, tannic acid, and acetic acid. Ascorbic acid and folic acid can be used in some embodiments, but they may not be used if not approved for human consumption. Malic Acid affects the flavor of the spirit, but may potentially be used alone or in combination with other additives to control the flavor. Phosphorous Acid I likely to alter the taste of the spirit significantly. Benzoic acid is not typically used in spirits but can be utilized to control the pH if needed. Lactic acid is likely to alter the taste of the spirit significantly but could be used, if necessary.

In some embodiments, the electrolyte enhanced spirit is selected from at least two of NaCl (sodium chloride), $NaHCO_3$ (sodium bicarbonate), KCl (potassium chloride), $KHCO_3$ (Potassium bicarbonate), $K_3PO_4$ (potassium phosphate), $C_4H_5K_2NO_4$ (potassium aspartate), $C_4H_5NNa_2NO_4$ (sodium aspartate), a person of ordinary skill in the art would understand that other electrolyte salts can be utilized and an additive for pH control. In such embodiment, the electrolyte enhanced spirit consists essentially of the spirit and at least two of NaCl (sodium chloride), $NaHCO_3$ (sodium bicarbonate), KCl (potassium chloride), $KHCO_3$ (Potassium bicarbonate), $K_3PO_4$ (potassium phosphate), $C_4H_5K_2NO_4$ (potassium aspartate), $C_4H_5NNa_2NO_4$ (sodium aspartate) and an additive for pH control. In other embodiments, the electrolyte enhanced spirit consists of the spirit and all of NaCl (sodium chloride), $NaHCO_3$ (sodium bicarbonate), KCl (potassium chloride), $KHCO_3$ (Potassium bicarbonate), $K_3PO_4$ (potassium phosphate), $C_4H_5K_2NO_4$ (potassium aspartate), $C_4H_5NNa_2NO_4$ (sodium aspartate), and an additive for pH control.

In some embodiments, the electrolyte enhanced spirit comprises a flavoring. Single flavor options are selected from at least one of: Cherry, Grapefruit, Lime, Pineapple, Peach, Watermelon, Lemon, Apple, Anise, Acai Berry, Apricot, Banana, Basil, Bacon, Birch Beer, Licorice, Berry, Bubble Gum, Butter, Citron, Citrus, Cake Batter, Candy Corn, Caramel, Cake, Cotton Candy, Cherry Blossom, Chocolate, Cinnamon, Coconut, Coffee, Cola, Cookie Dough, Cotton Candy, Cream Soda, Cucumber, Pickle, Dragonfruit, Doughnut, Elderberry, Eucalyptus, Flan, Fenugreek, Fruity Cereal, Ginger, Graham Cracker, Grape, Hazelnut, Honey, Huckleberry, Jalapeño, Key Lime, Kiwi, Lime, Macadamia Nut, Mango, Maple, Marshmallow, Melon, Mint, Mixed Berry, Mocha, Nutmeg, Orange, Prickly Pear, Papaya, Passion Fruit, Peach, Peanut, Pear, Pecan, Peppermint, Pineapple, Pistachio, Plum, Pomegranate, Pumpkin, Punch, Pepper, Raspberry, Root Beer, Sarsaparilla, Sassafras, Smoke, Sour, Sweet, Spice, Spearmint, Spruce, Strawberry, Tangerine, Vanilla, Rosemary, Wintergreen, Sweet Orange, Naval Orange and Clementine.

In other embodiments, combined flavorings may be utilized such as Lemon Lime, Mango Orange Pineapple, Blackberry Lemonade, Blueberry Lemonade, Raspberry Lemonade, Strawberry Lemonade, Irish Cream, Mocha Irish Cream, Black Cherry, Orange Tangerine, Orange Brandy, Orange Cream, Orange Mandarin, Orange Mango, Orange Pineapple, Mango Peach, Pink Lemonade, Raspberry Ginger Ale, Peach Mango, Dragonfruit Melon, Ginger Lime, Strawberry Guava, Cherry Limeade, Fruit Punch, Strawberry Kiwi, Black Cherry Lime, Blood Orange, White Chocolate, Tart Lemon, Toasted Coconut, Tropical Punch, Wild Cherry Cream, Lemon Bar, Lemon Custard, Lemon Meringue Pie, Lemonade, Blue Raspberry, Blackberry, Blueberry, Caramel Apple, Caramel Cream, Cherry Cream Spice, Black Licorice, Black Cherry Lemonade, Black Currant, Black Walnut, Carrot Cake, Cranberry, Cranberry Lime, Sweet pickle, Spicy Pickle, Dill Pickle, Cheesecake, Butter Pecan, Butter Rum, Butter Toffee, Butterscotch, French Vanilla, White Grape, Red Berry, Cucumber Lime, Mango Pineapple, Orange Cream Pop, Strawberry Colada, Pineapple Colada, Blue Raspberry, Sour Lemon Berry, Green Berry, Black Raspberry, Blue Citrus, Ice Tea, Sweet Tea, Ruby Red, Strawberry Lemongrass, Watermelon Basil, White Peach Rosemary, Apple Cider, Apple Cinnamon, Strawberry Banana, Strawberry Kiwi, Chocolate Cake, Cinnamon Roll, Sour Apple, Green Apple, Cherry Blackberry, Berry Pomegranate, Strawberry Watermelon, Sweet Tea, Strawberry Pineapple, Lemonade Ice Tea, Raspberry Green Tea, Lemon Ice Tea, Peach Ice Tea, Concord Grape, Malted Milk, Butter Almond, Ginger Ale, Green Tea, Ginger Beer, Ginger Lime, Buttermilk, Horchata, Eggnog, S'Mores, Tutti Frutti, Toffee, Bavarian Cream, Amaretto, Kettle Corn, Pumpkin Pie, Chocolate Mint, Melon Kiwi, Vanilla Cream, Whipped Cream, White Peach, Lemongrass, Gingerbread and Gingersnap. Ready to drink cocktails in bottles options: Long Island Iced Tea, Moscow Mule, Bloody mary's, Vodka Tonic, Any Form of Martini, Cosmopolitan, Black Russian, Screwdriver, Cape Codder, Sea Breeze/Bay Breeze, Sex on the Beach, Hairy Navel, Harvey Wallbanger, Pearl Harbor, Godmother, Greyhound, Kamikaze, White Russian, Tom Collins, Appletini, Blue Motorcycle, Mudslide, Smith & Wesson, Madras, Fuzzy Navel and Zipper as well as Creme de Menthe, Blue Curacao, Simple Syrup and Grand Mariner, Coconut Pineapple, Grapefruit Tangerine, Strawberry Lemon, Raspberry Lemon, Blueberry Lemon, Pink Lemon, Mango Punch, Cranberry Lemonade and Blood Orange Mango, or other margarita flavor combinations.

A method for manufacturing an electrolyte enhanced spirit comprises a number of steps. In one embodiment, sodium chloride is dissolved in double distilled water. Once the sodium chloride is dissolved, sodium bicarbonate is dissolved in the mixture. Potassium bicarbonate is then added to the mixture and mixed until dissolved. Then, potassium chloride is added and dissolved. Potassium phosphate is then dissolved in the mixture. The water mixture is combined with the distilled spirit to reduce the spirit to from approximately 95-97% ABV to approximately 40% ABV with the desired concentration of electrolytes. After the electrolyte enhanced spirit is at the desired % ABV the pH of the mixture is measured and, if necessary, lowered utilizing an additive such an acid.

Example 1

One electrolyte enhanced spirit containing 40% ABV at pH 9.5 vodka has the electrolyte concentrations shown in table 1 as follows:

|        | mg       | ml     | mg/ml   | w/v %   |                     |
|--------|----------|--------|---------|---------|---------------------|
| NaCL   | 363.75   | 750.00 | 0.48500 | 0.04850 | Sodium Chloride     |
| NaHCO3 | 371.25   | 750.00 | 0.49500 | 0.04950 | Sodium Bicarbonate  |
| KCl    | 663.75   | 750.00 | 0.88500 | 0.08850 | Potassium Chloride  |
| KHCO3  | 596.25   | 750.00 | 0.79500 | 0.07950 | Potassium Bicarbonate |
| K3PO4  | 150.00   | 750.00 | 0.20000 | 0.02000 | Potassium Phosphate |
| Total  | 2145.00  | 750.00 | 2.86000 | 0.28600 |                     |

Example 2

One alternative electrolyte enhanced spirit embodiment containing 40% ABV vodka has the electrolyte concentrations shown in table 2 as follows:

|        | mg       | ml     | mg/ml   | w/v %   |                     |
|--------|----------|--------|---------|---------|---------------------|
| NaCL   | 1548.75  | 750.00 | 2.06500 | 0.20650 | Sodium Chloride     |
| NaHCO3 | 866.25   | 750.00 | 1.15500 | 0.11550 | Sodium Bicarbonate  |
| KCl    | 1548.75  | 750.00 | 2.06500 | 0.20650 | Potassium Chloride  |
| KHCO3  | 1391.25  | 750.00 | 1.85500 | 0.18550 | Potassium Bicarbonate |
| K3PO4  | 700.00   | 750.00 | 0.93333 | 0.09333 | Potassium Phosphate |
| Total  | 6055.00  | 750.00 | 8.07333 | 0.80733 |                     |

Example 3

One alternative electrolyte enhanced spirit embodiment containing 40% ABV vodka has the electrolyte concentrations shown in table 3 as follows:

|        | mg     | ml     | mg/ml   | w/v %   |                     |
|--------|--------|--------|---------|---------|---------------------|
| NaCL   | 24.25  | 750.00 | 0.03233 | 0.00323 | Sodium Chloride     |
| NaHCO3 | 24.75  | 750.00 | 0.03300 | 0.00330 | Sodium Bicarbonate  |
| KCl    | 44.25  | 750.00 | 0.05900 | 0.00590 | Potassium Chloride  |
| KHCO3  | 39.75  | 750.00 | 0.05300 | 0.00530 | Potassium Bicarbonate |
| K3PO4  | 10.00  | 750.00 | 0.01333 | 0.00133 | Potassium Phosphate |
| Total  | 143.00 | 750.00 | 0.19067 | 0.01907 |                     |

Example 4

One alternative electrolyte enhanced spirit embodiment containing 40% ABV vodka has the electrolyte concentrations shown in table 4 as follows:

|        | mg      | ml     | mg/ml   | w/v %   |                     |
|--------|---------|--------|---------|---------|---------------------|
| NaCL   | 663.75  | 750.00 | 0.88500 | 0.08850 | Sodium Chloride     |
| NaHCO3 | 371.25  | 750.00 | 0.49500 | 0.04950 | Sodium Bicarbonate  |
| KCl    | 663.75  | 750.00 | 0.88500 | 0.08850 | Potassium Chloride  |
| KHCO3  | 596.25  | 750.00 | 0.79500 | 0.07950 | Potassium Bicarbonate |
| K3PO4  | 300.00  | 750.00 | 0.40000 | 0.04000 | Potassium Phosphate |
| Total  | 2595.00 | 750.00 | 3.46000 | 0.34600 |                     |

Example 5

One alternative electrolyte enhanced spirit embodiment containing 40% ABV vodka has the electrolyte concentrations shown in table 5 as follows:

|        | mg      | ml     | mg/ml   | w/v %   |                     |
|--------|---------|--------|---------|---------|---------------------|
| NaCL   | 663.75  | 750.00 | 0.88500 | 0.08850 | Sodium Chloride     |
| NaHCO3 | 371.25  | 750.00 | 0.49500 | 0.04950 | Sodium Bicarbonate  |
| KCl    | 363.75  | 750.00 | 0.48500 | 0.04850 | Potassium Chloride  |
| KHCO3  | 596.25  | 750.00 | 0.79500 | 0.07950 | Potassium Bicarbonate |
| K3PO4  | 150.00  | 750.00 | 0.20000 | 0.02000 | Potassium Phosphate |
| Total  | 2145.00 | 750.00 | 2.86000 | 0.28600 |                     |

Example 6

One alternative electrolyte enhanced spirit embodiment containing 40% ABV vodka has the electrolyte concentrations shown in table 6 as follows:

|        | mg      | ml     | mg/ml   | w/v %   |                     |
|--------|---------|--------|---------|---------|---------------------|
| NaCL   | 1548.75 | 750.00 | 2.06500 | 0.20650 | Sodium Chloride     |
| NaHCO3 | 866.25  | 750.00 | 1.15500 | 0.11550 | Sodium Bicarbonate  |
| KCl    | 1391.25 | 750.00 | 1.85500 | 0.18550 | Potassium Chloride  |
| KHCO3  | 1548.75 | 750.00 | 2.06500 | 0.20650 | Potassium Bicarbonate |
| K3PO4  | 150.00  | 750.00 | 0.20000 | 0.02000 | Potassium Phosphate |
| Total  | 5505.00 | 750.00 | 7.34000 | 0.73400 |                     |

Example 7

One alternative electrolyte enhanced spirit embodiment containing 40% ABV vodka has the electrolyte concentrations shown in table 7 as follows:

|      | mg     | ml     | mg/ml   | w/v %   |                 |
|------|--------|--------|---------|---------|-----------------|
| NaCL | 300.00 | 750.00 | 0.40000 | 0.04000 | Sodium Chloride |

-continued

|  | mg | ml | mg/ml | w/v % |  |
|---|---|---|---|---|---|
| NaHCO3 | 371.25 | 750.00 | 0.49500 | 0.04950 | Sodium Bicarbonate |
| KCl | 663.75 | 750.00 | 0.88500 | 0.08850 | Potassium Chloride |
| KHCO3 | 596.25 | 750.00 | 0.79500 | 0.07950 | Potassium Bicarbonate |
| K3PO4 | 150.00 | 750.00 | 0.20000 | 0.02000 | Potassium Phosphate |
| C4H5K2NO4 | 363.75 | 751.00 | 0.48435 | 0.04844 | Potassium Aspartate |
| Total | 2445.00 | 750.00 | 3.26000 | 0.32600 |  |

Example 8

One alternative electrolyte enhanced spirit embodiment containing 40% ABV vodka has the electrolyte concentrations shown in table 8 as follows:

|  | mg | ml | mg/ml | w/v % |  |
|---|---|---|---|---|---|
| NaCL | 10.00 | 750.00 | 0.01333 | 0.00133 | Sodium Chloride |
| NaHCO3 | 24.75 | 750.00 | 0.03300 | 0.00330 | Sodium Bicarbonate |
| KCl | 39.75 | 750.00 | 0.05300 | 0.00530 | Potassium Chloride |
| KHCO3 | 44.25 | 750.00 | 0.05900 | 0.00590 | Potassium Bicarbonate |
| K3PO4 | 10.00 | 750.00 | 0.01333 | 0.00133 | Potassium Phosphate |
| C4H5K2NO4 | 14.25 | 751.00 | 0.01897 | 0.00190 | Potassium Aspartate |
| Total | 143.00 | 750.00 | 0.19067 | 0.01907 |  |

Example 9

One alternative electrolyte enhanced spirit embodiment containing 40% ABV vodka has the electrolyte concentrations shown in table 9 as follows:

|  | mg | ml | mg/ml | w/v % |  |
|---|---|---|---|---|---|
| NaCL | 745.00 | 750.00 | 0.99333 | 0.09933 | Sodium Chloride |
| NaHCO3 | 866.25 | 750.00 | 1.15500 | 0.11550 | Sodium Bicarbonate |
| KCl | 1548.75 | 750.00 | 2.06500 | 0.20650 | Potassium Chloride |
| KHCO3 | 1391.25 | 750.00 | 1.85500 | 0.18550 | Potassium Bicarbonate |
| K3PO4 | 700.00 | 750.00 | 0.93333 | 0.09333 | Potassium Phosphate |
| C4H5K2NO4 | 803.75 | 751.00 | 1.07024 | 0.10702 | Potassium Aspartate |
| Total | 6055.00 | 750.00 | 8.07333 | 0.80733 |  |

Example 10

One alternative electrolyte enhanced spirit embodiment containing 40% ABV vodka has the electrolyte concentrations shown in table 10 as follows:

|  | mg | ml | mg/ml | w/v % |  |
|---|---|---|---|---|---|
| NaCL | 745.00 | 750.00 | 0.99333 | 0.09933 | Sodium Chloride |
| NaHCO3 | 866.25 | 750.00 | 1.15500 | 0.11550 | Sodium Bicarbonate |
| KCl | 1548.75 | 750.00 | 2.06500 | 0.20650 | Potassium Chloride |
| KHCO3 | 1391.25 | 750.00 | 1.85500 | 0.18550 | Potassium Bicarbonate |
| K3PO4 | 150.00 | 750.00 | 0.20000 | 0.02000 | Potassium Phosphate |
| C4H5K2NO4 | 803.75 | 751.00 | 1.07024 | 0.10702 | Potassium Aspartate |
| Total | 5505.00 | 750.00 | 7.34000 | 0.73400 |  |

Example 11

One alternative electrolyte enhanced spirit embodiment containing 40% ABV vodka has the electrolyte concentrations shown in table 11 as follows:

|  | mg | ml | mg/ml | w/v % |  |
|---|---|---|---|---|---|
| NaCL | 300.00 | 750.00 | 0.40000 | 0.04000 | Sodium Chloride |
| NaHCO3 | 371.25 | 750.00 | 0.49500 | 0.04950 | Sodium Bicarbonate |
| KCl | 300.00 | 750.00 | 0.40000 | 0.04000 | Potassium Chloride |
| KHCO3 | 596.25 | 750.00 | 0.79500 | 0.07950 | Potassium Bicarbonate |
| K3PO4 | 150.00 | 750.00 | 0.20000 | 0.02000 | Potassium Phosphate |
| C4H5NNa2O4 | 363.75 | 751.00 | 0.48435 | 0.04844 | Sodium Aspartate |
| C4H5K2NO4 | 363.75 | 751.00 | 0.48435 | 0.04844 | Potassium Aspartate |
| Total | 2445.00 | 750.00 | 3.26000 | 0.32600 |  |

Example 12

One alternative electrolyte enhanced spirit embodiment containing 40% ABV vodka has the electrolyte concentrations shown in table 12 as follows:

|  | mg | ml | mg/ml | w/v % |  |
|---|---|---|---|---|---|
| NaCL | 10.00 | 750.00 | 0.01333 | 0.00133 | Sodium Chloride |
| NaHCO3 | 24.75 | 750.00 | 0.03300 | 0.00330 | Sodium Bicarbonate |
| KCl | 39.75 | 750.00 | 0.05300 | 0.00530 | Potassium Chloride |
| KHCO3 | 44.25 | 750.00 | 0.05900 | 0.00590 | Potassium Bicarbonate |
| K3PO4 | 10.00 | 750.00 | 0.01333 | 0.00133 | Potassium Phosphate |
| C4H5NNa2O4 | 14.25 | 751.00 | 0.01897 | 0.00190 | Sodium Aspartate |
| C4H5K2NO4 | 14.25 | 751.00 | 0.01897 | 0.00190 | Potassium Aspartate |
| Total | 157.25 | 750.00 | 0.20967 | 0.02097 |  |

Example 13

One alternative electrolyte enhanced spirit embodiment containing 40% ABV vodka has the electrolyte concentrations shown in table 13 as follows:

|  | mg | ml | mg/ml | w/v % |  |
|---|---|---|---|---|---|
| NaCL | 745.00 | 750.00 | 0.99333 | 0.09933 | Sodium Chloride |
| NaHCO3 | 866.25 | 750.00 | 1.15500 | 0.11550 | Sodium Bicarbonate |
| KCl | 745.00 | 750.00 | 0.99333 | 0.09933 | Potassium Chloride |
| KHCO3 | 1391.25 | 750.00 | 1.85500 | 0.18550 | Potassium Bicarbonate |
| K3PO4 | 700.00 | 750.00 | 0.93333 | 0.09333 | Potassium Phosphate |
| C4H5NNa2O4 | 803.75 | 751.00 | 1.07024 | 0.10702 | Sodium Aspartate |
| C4H5K2NO4 | 803.75 | 751.00 | 1.07024 | 0.10702 | Potassium Aspartate |
| Total | 6055.00 | 750.00 | 8.07333 | 0.80733 |  |

Example 14

One alternative electrolyte enhanced spirit embodiment containing 40% ABV vodka has the electrolyte concentrations shown in table 14 as follows:

|  | mg | ml | mg/ml | w/v % |  |
|---|---|---|---|---|---|
| NaCL | 745.00 | 750.00 | 0.99333 | 0.09933 | Sodium Chloride |
| NaHCO3 | 866.25 | 750.00 | 1.15500 | 0.11550 | Sodium Bicarbonate |
| KCl | 745.00 | 750.00 | 0.99333 | 0.09933 | Potassium Chloride |
| KHCO3 | 1391.25 | 750.00 | 1.85500 | 0.18550 | Potassium Bicarbonate |
| K3PO4 | 150.00 | 750.00 | 0.20000 | 0.02000 | Potassium Phosphate |
| C4H5NNa2O4 | 803.75 | 751.00 | 1.07024 | 0.10702 | Sodium Aspartate |
| C4H5K2NO4 | 803.75 | 751.00 | 1.07024 | 0.10702 | Potassium Aspartate |
| Total | 5505.00 | 750.00 | 7.34000 | 0.73400 |  |

Although the embodiments and applications of the present invention have been shown and described, it would be evident to those skilled in the art and knowing this description that many more different modifications from those mentioned above are possible without departing from the inventive concepts of this document. Therefore, the invention should be restricted only to the spirit of the claims.

What is claimed is:

1. An electrolyte enhanced spirit, consisting of:
   a spirit having an alcohol by volume concentration of between about 35% to about 45%; wherein the spirit is vodka; and
   sodium chloride in a concentration of between 0.003 and 0.207% w/v;
   sodium bicarbonate in a concentration of between 0.003 and 0.116% w/v;
   potassium chloride in a concentration of between 0.006 and 0.207% w/v;
   potassium bicarbonate in a concentration of between 0.005 and 0.186% w/v; and
   potassium phosphate in a concentration of between 0.001 and 0.093% w/v.

2. The electrolyte enhanced spirit of claim 1 wherein:
   sodium chloride has a concentration of 0.049% w/v;
   sodium bicarbonate has a concentration of 0.050% w/v;
   potassium chloride has a concentration of 0.089% w/v;
   potassium bicarbonate has a concentration of 0.080% w/v; and
   potassium phosphate has a concentration of 0.020% w/v.

3. An electrolyte enhanced spirit, consisting of:
   a spirit having an alcohol by volume concentration of between about 35% to about 45%;
   wherein the spirit is vodka; and
   sodium chloride in a concentration of between 0.003 and 0.207% w/v;
   sodium bicarbonate in a concentration of between 0.003 and 0.116% w/v;
   sodium aspartate in a concentration of between 0.002 and 0.100% w/v;
   potassium chloride in a concentration of between 0.006 and 0.207% w/v;
   potassium bicarbonate in a concentration of between 0.005 and 0.186% w/v;
   potassium phosphate in a concentration of between 0.001 and 0.093% w/v; and
   potassium aspartate in a concentration of between 0.002 and 0.100% w/v.

* * * * *